United States Patent [19]

Kuche

[11] Patent Number: 5,546,882
[45] Date of Patent: Aug. 20, 1996

[54] ARRANGEMENT FOR TOWING

[75] Inventor: Hans-Walter Kuche, Sprockhövel, Germany

[73] Assignee: Petroleum Geo-Services A/S, Lysaker, Norway

[21] Appl. No.: 499,294

[22] Filed: Jul. 7, 1995

[30] Foreign Application Priority Data

Jul. 13, 1994 [NO] Norway ................................. 942623

[51] Int. Cl.$^6$ ................................................. B63B 21/56
[52] U.S. Cl. .............................................................. 114/244
[58] Field of Search ................................... 114/243–247; 367/16

[56] References Cited

U.S. PATENT DOCUMENTS

| | | | |
|---|---|---|---|
| 3,374,852 | 3/1968 | Strange et al. | 367/16 |
| 3,398,715 | 8/1968 | Burg. | |
| 3,477,696 | 11/1969 | Walstrom. | |
| 4,033,278 | 7/1977 | Waters | 114/245 |
| 4,233,677 | 11/1980 | Brown et al. | |

FOREIGN PATENT DOCUMENTS

| | | |
|---|---|---|
| 2247527 | 3/1992 | United Kingdom. |
| 173206 | 6/1988 | WIPO. |

*Primary Examiner*—Jesus D. Sotelo
*Attorney, Agent, or Firm*—Bardehle, Pagenberg, Dost, Altenburg, Frohwitter, Geissler & Partners

[57] ABSTRACT

Apparatus for towing a surface buoy or float, in particular a reference position buoy (1), from a marine seismic streamer (4) being adapted during operation to be immersed in the sea. The towing takes place by a means of a length of cable or the like (5A,5B) being attached to a section of the streamer and to the surface buoy respectively. At an intermediate portion of the length of cable (5A,5B) there is provided a weight or deflector device (2) being adapted during towing to impose an angular deviation of the length of cable so that the direction thereof downwards (5A) and upwards (5b) from the weight or deflector device (2), forms a mutual angle (Vb) differing significantly from 180°. The point of attachment (3) at the streamer is located at an active section (4) thereof.

7 Claims, 1 Drawing Sheet

ARRANGEMENT FOR TOWING

BACKGROUND OF THE INVENTION

In marine seismic exploration it is important to be able to determine the position or shape of one or more streamer cables being towed behind an exploration vessel. It is common practice to let the position determination be based upon a navigation system of higher level, as, for example, GPS satellites, which gives a number of reference positions in the total arrangement being towed. The number of reference positions is mostly relatively low, and as a rule the reference positions are associated with the forward part of the whole assembly being towed as well as to one or more end buoys which terminate the assembly. The shape or path of the streamers over the relatively long distance between the forward and the rearward end of the towed assembly, is usually determined by means of a number of magnetic compasses being provided on the streamer, in particular at the active sections thereof. Moreover there are known proposals based upon trilateration (Norwegian published patent application No. 173.206) for the purpose of avoiding the dependancy on magnetic compasses.

It is also known per se to tow surface buoys or floats being anchored to sections of the streamer, but in such cases the buoys or floats are not anchored to the active sections of the streamer. The problem in this connection consists therein that this kind of buoy or float will introduce noise which interferes with the detection and the recording of reflected seismic signals.

Thus, on the above background this invention takes as a starting point an apparatus for towing a surface buoy or float, in particular a reference position buoy from a marine seismic streamer adapted to be immersed in the sea during operation, whereby the towing takes place by means of a length of cable or the like being attached to a section of the streamer and to the surface buoy respectively.

SUMMARY OF THE INVENTION

What is novel and specific to the apparatus according to the invention in the first place consists therein, that at an intermediate portion of the length of cable there is provided a weight or deflector device being adapted during towing to impose an angular deviation of the length of cable so that the direction thereof downwards and upwards from the weight or deflector device forms a mutual angle differing significantly from 180°, and that the attachment point at the streamer is located at an active section thereof.

With this solution the geometrical relationships associated with the towing cable length for the surface buoy will result in a substantially reduced transfer of vertical forces between the buoy and the active streamer section, so that the movements of the buoy because of waves or other irregularities, will not be transferred as vertical forces, and thereby noise, to the streamer.

DESCRIPTION OF THE DRAWING

In the following description the invention will be explained more closely with reference to the drawing, which in elevation illustrates an embodiment of the towing apparatus according to the invention.

DETAILED DESCRIPTION OF THE INVENTION

Figure 1:
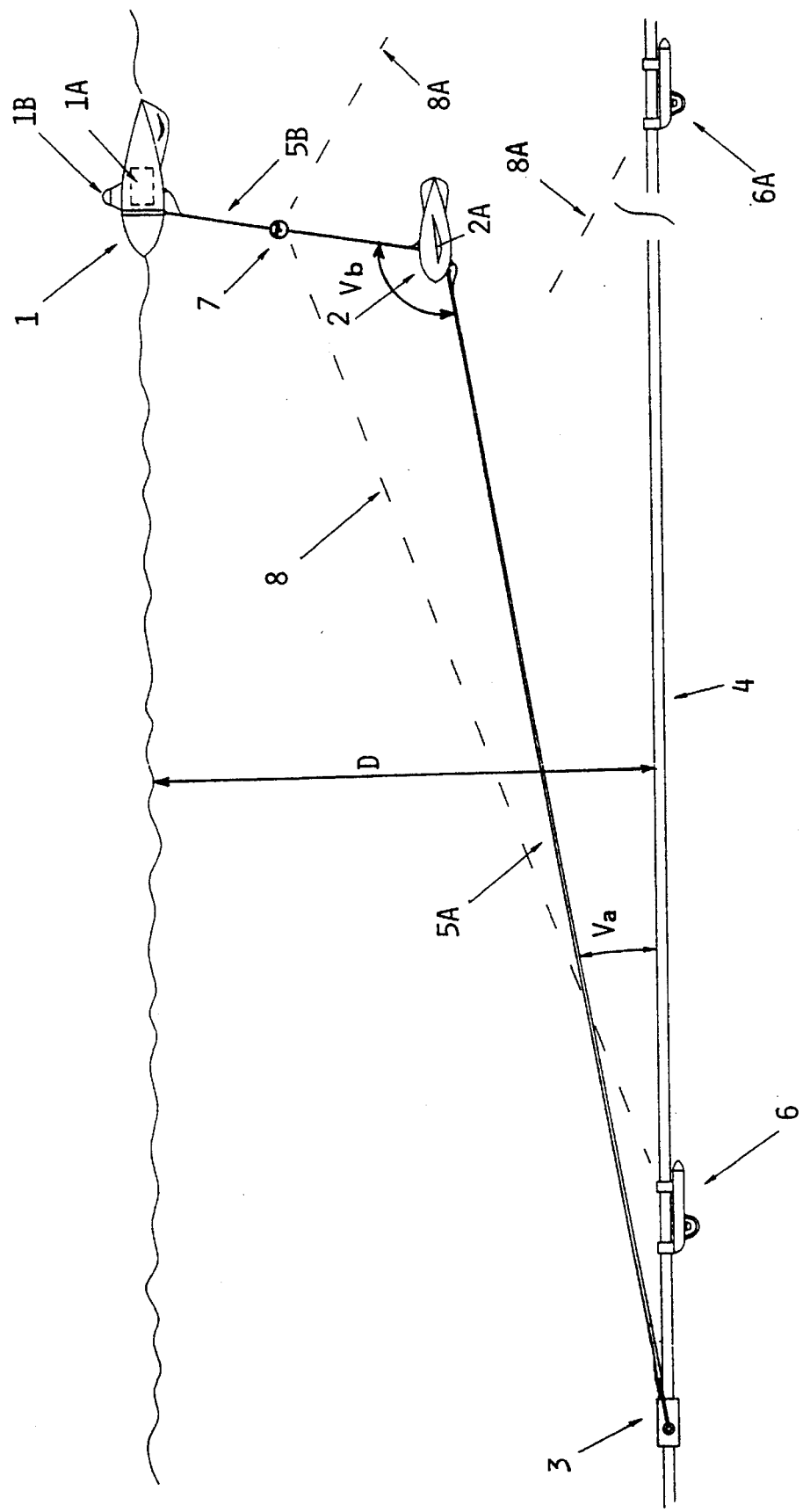
FIG. 1 shows a plan view of an apparatus according to an embodiment of the invention.

The drawing shows a buoy or float 1 at the sea surface and preferrably provided with a GPS receiver 1A with an associated antenna 1B so as to serve as a reference position in a seismic assembly being towed. Through a length of cable consisting of two parts 5A and 5B the buoy 1 is connected to a point of attachment or an adapter 3 at an active section 4 of a long streamer. The cable length 5A, 5B primarily comprises a flexible tension element adapted to sustain the tensional forces occuring, for example a wire element, but besides usually comprises leads or cables for electrical connections, i.e. in particular signal or data transmission between the buoy 1 and the streamer 4 or units provided in or on the streamer.

In contrast to known arrangements for towing a surface buoy or float, whereby the towing wire extends directly from a point of attachment at the underwater streamer concerned, to the underside of the buoy or float, the length of cable 5A–5B in the drawing has a significant angular deviation provided for by a weight device 2 being preferrably streamlined and being located at an intermediate portion of the whole cable length 5A–5B. With a sufficiently heavy weight of the device 2 this will pull down the cable length 5A–5B so that the angle Va between the cable length part 5A and the active streamer section 4 itself, will be substantially reduced in relation to a direct towing wire as mentioned above. In a corresponding manner the angle Vb between the two parts 5A and 5B of the towing cable length, will be significantly reduced in relation to such an angle of 180°, which would be found in the case of direct towing.

When seismic streamers are towed, the depth D of the streamer as indicated in the drawing, will be maintained at a certain magnitude by means provided specifically for this purpose. Therefore this depth D can be regarded as of known magnitude in the geometric relationships being of interest with respect to the relation between the reference position represented by the buoy 1 and points of interest along the length of the streamer 4. Moreover the length of the cable 5A–5B is of known magnitude, whereby the part 5A is the more significant part, whereas the part 5B in the first place is usually much shorter than the part 5A and in the second place will run almost vertically upwards from the weight device 2 to the buoy 1. Accordingly the relative position of the buoy 1 as seen in the longitudinal direction of the streamer 4, is quite well defined.

For a still more accurate definition of the reference position represented by the buoy 1 in relation to the longitudinal extension of the streamer 4, the embodiment of the drawing shows acoustic positioning units, i.e. transceivers 6 and 7 being located at the streamer 4 and at the upper cable part 5B respectively. The positioning unit 6 is preferrably located close to the attachment point 3 and the positioning unit 7 is suspended closely underneath the buoy 1. Then the position of the latter unit will vary only to a very small extent in relation to the buoy. In a manner known per se the acoustic positioning units 6 and 7 can then cooperate, as illustrated by the signal path 8, through the seawater between these units, in order to determine the mutual distance between the buoy 1 and the point at the streamer 4 being represented by the positioning unit 6. For further reliability in this relative position determination, the acoustic unit 7 can also cooperate with another acoustic positioning unit 6A on the streamer 4 at a distance rearward of the positioning unit 6. The signal path between the units 7 and 6A is illustrated at 8A.

The geometric relationships discussed above are valid for the relative position determination, provided that the buoy 1, and besides the weight device 2, are located substantially in a vertical plane through the streamer 4. In practical operations this will generally be satisfied.

Considering the so-called weight device 2 more in detail, it is a great advantage to design this device as a streamlined body having a significant weight in water. So as to contribute to the above discussed angular deviation represented by the angle Vb, the device or body 2 can be provided with deflector surfaces or wings 2A, the angle of which can be adjustable if desired.

The length of cable 5A–5B, and in particular the cable part 5B can be provided in a manner known per se with friction or drag reducing elements, such as ribbons or threads which result in a decrease of water resistance. This can contribute, inter alia, to obtaining a more vertical direction of the cable part 5B.

It is obvious that a streamer may have a number of reference position buoys located along its total length, so that the employment of magnetic compasses or the like will be superfluous. In many cases it will be sufficient in practice to provide a reference position buoy adjacent to the forward end of the active streamer section or sections, and besides such a reference position buoy approximately midway between the end points of the active section or sections. As previously known per se it will also be suitable to provide for a reference position at the rear end, for example at an end buoy for each streamer.

Moreover when two or more streamers are towed side by side, the acoustic transceiver units 6, 6A and 7 belonging to each such streamer will be able to cooperate laterally for establishing a network for further securing an accurate position determination of the respective streamers.

As mentioned above, the towing length of cable 5A–5B preferably comprises leads or a cable for communication between equipment on the buoy 1 and the acoustic positioning unit 7 at one side, and equipment or units at the streamer 4 at the other side. Signal and data communication between these components in the total arrangement being towed and the towing vessel, therefore can take place by electrical cable so that there is no need for a radio link for this purpose. This gives a secure and reliable communication, since a radio connection can involve problems such as damage to the antennae and also radio interference as well as lack of available channel capacity.

I claim:

1. Apparatus for towing a surface buoy, in particular a reference position buoy, from a marine seismic streamer comprising: a flexible element which is attached at only one point of attachment to a section of the streamer and to the surface buoy respectively, wherein an intermediate portion of the cable length is provided with a weight or deflector device being adapted during towing to impose an angular deviation of the flexible element so that the direction thereof downwards and upwards from the weight or deflector device forms a mutual angle differing significantly from 180°, and that the point of attachment at the streamer is located at an active section thereof.

2. Apparatus according to claim 1, wherein the weight or deflector device comprises a streamlined body having a significant weight in water.

3. Apparatus according to claim 2, wherein the weight or deflector device comprises deflector surfaces which together with the weight of the body contribute to said angular deviation of the flexible element.

4. Apparatus according to claim 3 wherein the weight or deflector device is mounted to said flexible element closer to the reference position buoy than to the point of attachment at the streamer.

5. Apparatus for towing a surface buoy, in particular a reference position buoy, from a marine seismic streamer comprising: a flexible element which is attached at only one point of attachment to a section of the streamer and to the surface buoy respectively; wherein an acoustic positioning unit is positioned adjacent the point of attachment of the flexible element at the streamer, and an intermediate portion of the flexible element is provided with a weight or deflector device comprising a streamlined body having significant weight in water and comprising deflector surfaces which together with the weight of the body contribute to said angular deviation of the flexible element so that the direction thereof downwards and upwards from the weight or deflector device, forms a mutual angle differing significantly from 180°, and further comprising an acoustic positioning unit on the streamer adjacent the point of attachment of the flexible element.

6. Apparatus according to claim 5, further comprising another acoustic positioning unit attached to the flexible element adjacent to the reference position buoy for cooperation with said acoustic positioning unit.

7. Apparatus according to claim 6, further comprising electrical leads associated with the flexible element and the streamer respectively, for communication between the reference position buoy and/or the acoustic positioning unit(s) and a towing vessel.

* * * * *